United States Patent
Bestmann

(10) Patent No.: US 8,810,857 B2
(45) Date of Patent: Aug. 19, 2014

(54) METHOD AND PRINTING SYSTEM FOR GRAY BALANCE CORRECTION OF A PRINTING PROCESS, COMPUTER PROGRAM PRODUCT AND COMPUTER PROGRAM STORAGE DEVICE

(75) Inventor: Guenter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 152 days.

(21) Appl. No.: 13/433,578

(22) Filed: Mar. 29, 2012

(65) Prior Publication Data
US 2012/0250095 A1 Oct. 4, 2012

Related U.S. Application Data

(60) Provisional application No. 61/471,906, filed on Apr. 5, 2011.

(30) Foreign Application Priority Data

Mar. 29, 2011 (DE) .......................... 10 2011 015 306

(51) Int. Cl.
- *H04N 1/40* (2006.01)
- *G03F 3/08* (2006.01)

(52) U.S. Cl.
USPC ........... 358/3.01; 358/2.1; 358/3.02; 358/518

(58) Field of Classification Search
USPC ................. 358/1.9, 2.1, 3.01, 3.02, 518, 504; 399/39
See application file for complete search history.

(56) References Cited

U.S. PATENT DOCUMENTS

| 5,774,146 A | 6/1998 | Mizutani |
|---|---|---|
| 7,453,591 B2 | 11/2008 | Yao |

(Continued)

FOREIGN PATENT DOCUMENTS

| DE | 102 26 563 A1 | 1/2003 |
|---|---|---|
| DE | 10 2008 031 735 A1 | 1/2009 |

(Continued)

OTHER PUBLICATIONS

Balasubramanian R: "Optimization of the Spectral Neugebauer Model for Printer Characterization", Journal of Electronic Imaging, SPIE / IS & T, vol. 8, No. 2, Apr. 1, 1999, pp. 156-166, XP000825806.

*Primary Examiner* — Barbara Reinier
(74) *Attorney, Agent, or Firm* — Laurence A. Greenberg; Werner H. Stemer; Ralph E. Locher

(57) ABSTRACT

A method and a printing system for gray balance correction of a printing process include determining first color values at on a gray axis of a color space of a reference printing process. These first color values determine tonal values describing a corrected gray balance of the target printing process. To avoid wastage and a further proof for gray balance calibration of the printing process, second color values of the printing process, describing the corrected gray balance, are derived from the first color values. The tonal values of the target printing process corresponding to the second color values are determined from first characterization data and the second color values of the printing process. A correction function created from these tonal values describes the corrected gray balance. Determining corrected characterization data is also possible. A printing form is produced and a printing material is imaged by using the corrected gray balance.

10 Claims, 4 Drawing Sheets

(56) References Cited

U.S. PATENT DOCUMENTS

| | | |
|---|---|---|
| 7,773,252 B2 * | 8/2010 | Yoshida et al. ............... 358/1.9 |
| 2004/0070776 A1 | 4/2004 | Yao et al. |
| 2005/0012943 A1 | 1/2005 | Yao |
| 2006/0197966 A1 | 9/2006 | Viturro et al. |
| 2009/0015855 A1 * | 1/2009 | Bestmann ..................... 358/1.9 |
| 2010/0110461 A1 | 5/2010 | Hallam |
| 2010/0134846 A1 | 6/2010 | Yan |
| 2010/0271665 A1 | 10/2010 | Wen et al. |
| 2011/0235073 A1 | 9/2011 | Bestmann |

FOREIGN PATENT DOCUMENTS

| | | |
|---|---|---|
| DE | 10 2008 056 170 A1 | 6/2009 |
| DE | 10 2011 012 806 A1 | 9/2011 |
| EP | 0 421 003 A1 | 4/1991 |
| EP | 1 279 502 A1 | 1/2003 |
| EP | 1 501 281 A2 | 1/2005 |
| EP | 2 295 256 A1 | 3/2011 |

* cited by examiner

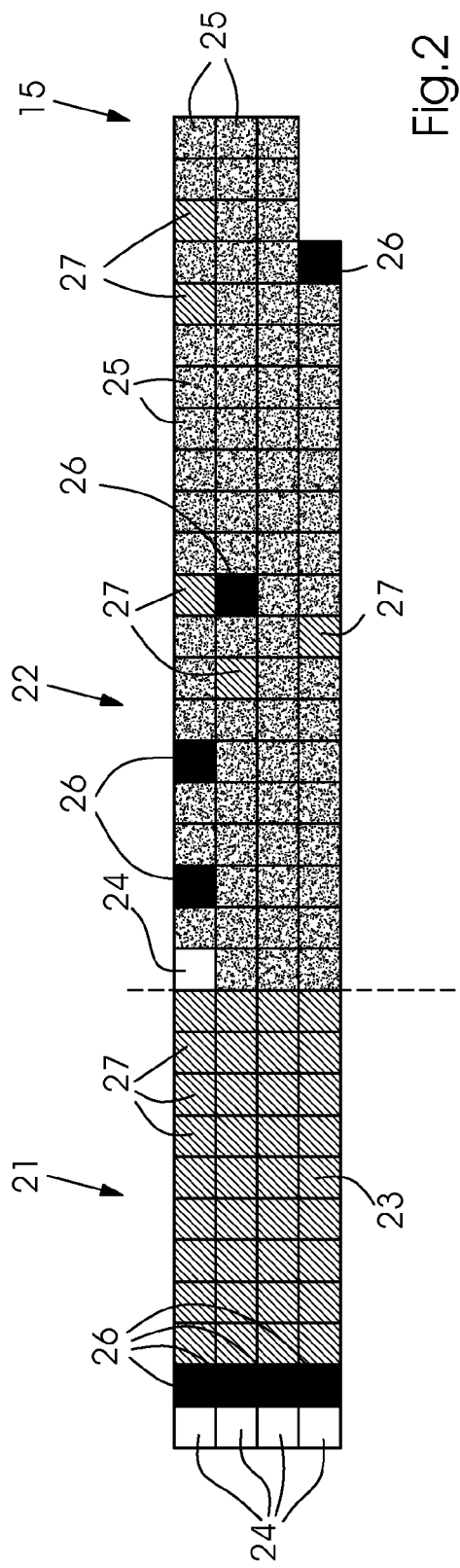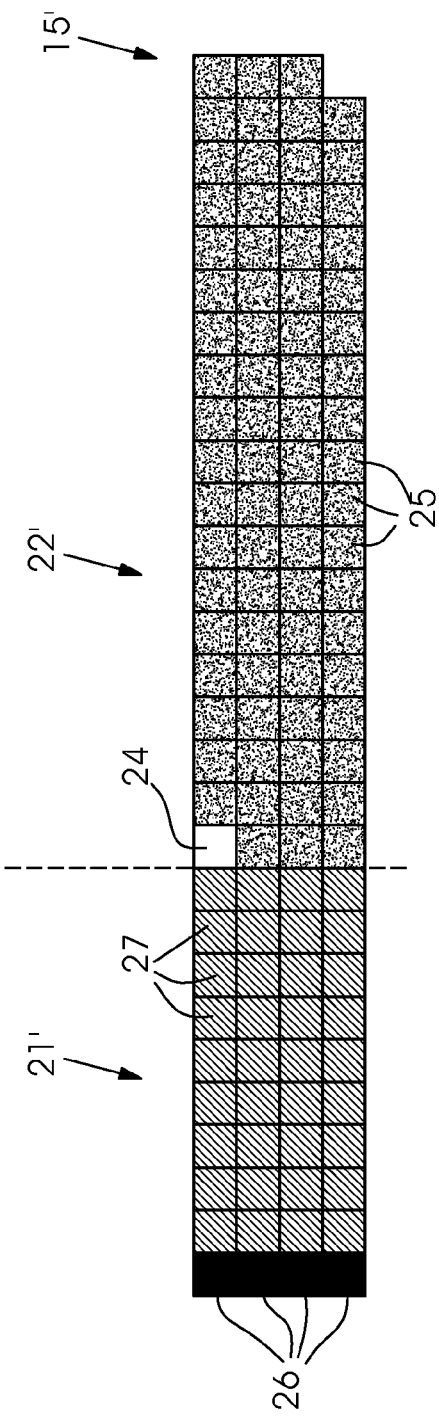

METHOD AND PRINTING SYSTEM FOR GRAY BALANCE CORRECTION OF A PRINTING PROCESS, COMPUTER PROGRAM PRODUCT AND COMPUTER PROGRAM STORAGE DEVICE

CROSS-REFERENCE TO RELATED APPLICATION

This application claims the priority, under 35 U.S.C. §119, of German Patent Application DE 10 2011 015 306.3, filed Mar. 29, 2011, and claims the priority, under 35 U.S.C. §119 (e), of U.S. Provisional Patent Application No. 61/471,906 filed Apr. 5, 2011; the prior applications are herewith incorporated by reference in their entirety.

BACKGROUND OF THE INVENTION

Field of the Invention

The present invention relates to a method for gray balance correction of a printing process, which will also be designated as a target printing process below. For this purpose, in a reference printing process, first color values are determined on or in surroundings of a gray axis of a color space of the reference printing process. The invention also relates to a printing system for gray balance correction of a printing process, a computer program product and a computer program storage device.

These first color values are then used further for determining tonal values of the target printing process, in which these tonal values describe a corrected gray balance of the target printing process.

The gray balance is defined as a set of tonal values for chromatic process colors, such as cyan, magenta and yellow (CNY), for which the printing results in a non-chromatic color under defined viewing conditions. The predefined printing conditions therefor are defined, for example in process standards, such as the process standard for offset printing or the MedienStandard Druck of the BVDM [Print Media Standard of the German Federal Print and Media Association]. Those are in turn based on stipulations from the corresponding ISO standard, such as ISO 12647-2:2004. The viewing conditions are likewise standardized by the ISO.

Suitable printing processes are offset printing, gravure printing or others. Digital printing processes, such as electro-photography or other "non-impact printing" methods, are also possible. That list is not intended to be final but merely to indicate examples.

For those printing processes, in reproduction technology, printing originals for printed pages are produced which contain all of the elements to be printed such as text, graphics and images. In the case of the electronic production of the printing originals, those elements are present in the form of digital data. The data for an image is produced, for example, by scanning the image point by point and line by line in a scanner, with each image point being broken down into color components and the color components being digitized. Images are usually broken down in a scanner into the color components red, green and blue (RGB), that is to say into the components of a three-dimensional color space. For a colored print, however, other color components are needed. In that case, in general, different chromatic printing inks and black can be used in order to produce a corresponding colored printed image on a printing material. In the case of four-color printing, those are the printing inks cyan, magenta, yellow and black (CMYK), that is to say the components of a four-dimensional color space. For that purpose, the image data from the RGB color space of the scanner are transformed into the CMYK color space of the printing process to be used.

During that transformation, each color value is assigned a combination of the process colors, i.e. the printing inks of the initial color space. Each process color is assigned its own printing original, which is a so-called color separation. Printing forms are produced on the basis of the color separations for the subsequent printing process. In the case of offset printing, those are printing plates.

In order to produce the printing plates, firstly films can be exposed and then the printing plates can be imaged through the use of those films. In current digital imaging methods, the printing plates assigned to the individual color separations are produced by being exposed in a plate exposer. For that purpose, through the use of a so-called raster image processor (RIP), first of all a digitally screened bitmap is produced which indicates which points on the printing plate are to be exposed and which are not. Each color value to be produced is assigned a tonal value of the corresponding color separation by the RIP. For instance, the predefined color values can be represented by the color components CMYK digitized with eight bits. That means that each color component of the process colors is assigned 256 tonal value steps. The tonal value of a screen dot is determined by the number of exposer pixels imaged in the screen cell assigned to the screen dot. A screen cell includes, for example, 256 possible individual pixels. Depending on how many of those pixels on a printing plate are exposed in a screen cell, the result is a tonal value from 0 to 100% for that screen dot.

In order to produce specific tonal values through the use of the different color separations, the tonal value combinations of the process colors which correspond to the predefined color values are stored in a color profile. Instead of the term color profile, the term profile will also be used below. In order to reduce the size of a corresponding look-up table, not all of the possible combinations of the color components CMYK are stored but only the value combinations for a coarser regular grid of intersections in the CMYK color space. For CMYK value combinations which lie between the grid points and for corresponding color values of a device-independent color space, such as the CIELab color space, the tonal value combinations or color values sought are interpolated from the adjacent intersections.

Since there are a number of CMYK color value combinations which correspond to a single color value of the device-independent color space, there are also different possible ways of storing a corresponding profile for the assignment in order to obtain an unambiguous assignment of color values and tonal value combinations.

On the other hand, not only is there a need to produce the color values in a specific way through the use of tonal value combinations of the process colors in a printing process but the problem is also posed that, depending on the printing materials being used, in particular the color thereof, equipment, inks and other boundary conditions, the tonal values actually produced on the printing material in the printing process deviate from the predefined intended values. German Patent Application DE 102 26 563 A1 therefore discloses a method of producing, before the production of printing plates, test printing forms which have test forms which are assigned to specific intended tonal values and are formed by different tonal value combinations. On the basis of the exposure of corresponding test printing forms and use in a specific printing process, by measuring the test forms produced on the printing material, a relationship between the actual tonal values produced and the predefined intended tonal values can be produced, and the assignment of the tonal values of the process colors to the intended tonal values in accordance with a tonal value characteristic curve for the imaging of printing forms for that printing process can be memorized or stored corrected in a process calibration.

In the predefined color profile, the tonal value gains according to the process calibration for a predefined printing condition, i.e. for a printing process, are taken into account. In that case, the printing condition contains the information about the printing inks being used and the papers being used in the printing process described. For instance, characterization data can be provided in accordance with FOGRA39 for the printing condition: offset paper type 1+2 glossy and matt coated paper with tonal value gain curves A (CMY) and B (K). To that end, an appropriate color profile is provided which takes into account the tonal value gains for the corresponding paper type and the corresponding printing inks in the offset print.

Furthermore, it is possible to control fluctuations and deviations in a printing process through the use of pre-settings or re-adjustments of inking zone screws. By using the latter, the layer thickness of a process color can be varied manually within limits, in order to achieve adaptation of the actual tonal values to the desired intended tonal values in that way, even during the printing process and without re-imaging printing plates.

If, now, a corresponding tonal value characteristic curve for the imaging of a printing form is stored and there is an assignment of intended tonal values to specific tonal value combinations according to a printing process, then the printing plates are imaged in accordance with the individual color separations and used in a printing press.

In order to check the inking and the register, the printing plates being used are imaged with further test forms in edge regions or between individual pages and/or appropriate process control strips with different colored areas are provided. European Patent EP 1 279 502 B1 provides a gray balance area, for example, in which a screened area of the black ink (K) with a coverage of 40% is assigned directly to a colored area of the other printing inks (CMY) which, according to a color profile, should have the same gray color value as the 40% K area. If differences of the gray color values from the chromatic gray area and the black area of that gray balance area can be detected visually, then a densitometric measurement of further full-tone areas is suggested for more accurate checking.

Furthermore, such a gray balance area can also be measured colorimetrically. If it is determined in that case that the actual color values do not correspond to the intended color values, then the inking zone screws are readjusted and the layer thickness of the corresponding process color is increased or reduced. As a result, however, both the full-tone inking of the corresponding process color and the corresponding tonal value gains, and therefore the overprinting response overall, is changed. Through that change in the layer thickness, it is only possible for a desired effect to be achieved within limits in order to bring the actual values close to the intended values, since all of the color values change globally. Thus, for instance, it may be desirable, in particular, to correct the gray balance in one tonal value region but, undesirably, a new color error is also produced in another tonal value area as a result.

For instance, in order to counteract a red color error in the quarter-tone range, it may involve either increasing the layer thickness of cyan or reducing that of yellow and magenta. As a result, the cyans and tonal value gains of the process colors involved increase or decrease. The error in the gray reproduction in the quarter-tone range is corrected by that measure but it is possible for a displacement of the gray reproduction in the three-quarter tone to occur. At the same time, the error in the color values and the tonal value gain is increased.

As a result of that correction by layer thickness variation, compromises resulting from the production of other errors or discolorations therefore have to be tolerated. Secondly, those corrections have to be made again during each printing operation.

Just when different papers and/or different printing inks are used in a print shop than were present for the production of the calibration characteristic curve then, despite correctly set inking and correctly calibrated tonal value gain, differences in the gray reproduction result. Although they can be compensated for by the layer thickness variation described, other undesired errors occur and, in addition, regular wastage when starting printing occurs.

A further correction method for the gray balance is proposed in German Patent Application DE 10 2008 031 735 A1, corresponding to U.S. Patent Application Publication No. US 2009/0015855. In that case, chromatic gray areas are printed in a process control strip. A first chromatic gray area contains a tonal value combination of the colored printing inks which, according to predefined conditions, corresponds to a specific gray value. Other chromatic gray areas are disposed adjacently, in which the tonal value combination corresponds substantially to that of the first chromatic gray area, with an individual colored printing ink being varied slightly in each case. That chromatic gray area which lies closest to the gray axis of a device-independent color space can be determined through the use of colorimetric measurement of the individual chromatic gray areas. In that way, at least tonal value combinations of some of the colored printing inks which result in the closest possible gray value in the color space are determined. However, the lightness difference between a desired gray value and the actually printed gray value is not also taken into account.

In the method described, it is particularly problematic if papers are used in the actual printing which, although they nominally correspond to the papers from the predefined printing condition of the color profile, nevertheless have different hues. The same is true of the black printing ink being used which, in general, also exhibits a color error. A corresponding colorimetric measurement of the chromatic gray areas therefore firstly does not take into account the visual sensation of a corresponding black area on the same printing material, nor any possible lightness difference between a black control area and a chromatic gray area with the same intended gray value.

SUMMARY OF THE INVENTION

It is accordingly an object of the invention to provide a method and a printing system for gray balance correction of a printing process, a computer program product and a computer program storage device, which overcome the hereinafore-mentioned disadvantages of the heretofore-known methods, systems, program products and program storage devices of this general type and with which regularly occurring wastage can be reduced and the occurrence of undesired color fluctuations can be avoided.

With the foregoing and other objects in view there is provided, in accordance with the invention, a method for gray balance correction of a target printing process. The method comprises determining first color values on or in surroundings of a gray axis of a color space of a reference printing process for the reference printing process, determining chromatic tonal values of the target printing process by using the first color values and at least describing a corrected gray balance of the target printing process with the tonal values, determining second color values of the target printing process describing the corrected gray balance of the target printing process, deriving the second color values from the first color values, determining first characterization data of the target printing process, determining the tonal values of the target printing process corresponding to the second color values from the first characterization data and the second color values, creating, from the tonal values, a correction function describing a corrected assignment of color values to tonal values or first tonal values to corrected tonal values of the target printing process in accordance with the corrected gray balance and/or determining corrected characterization data including the corrected gray balance from the tonal values, producing at least one printing form based on a corrected assignment of the tonal value assignment according to the corrected gray balance, and imaging a printing material using the printing form.

A gray balance is predefined through the use of first color values from a reference printing process. For this purpose, these first color values lie either on the gray axis of the color space of the reference printing process itself or at least in the environment thereof. The color values can alternatively also be defined by predefining first tonal values of the chromatic process colors of the reference printing process. For this purpose, tonal value combinations of the chromatic printing inks, e.g. CMY, are predefined which result approximately in a printed gray. These can be, for example, the gray steps CMY=25/19/19%, 50/40/40% and 75/66/66%. First color values which are assigned to these predefined first tonal values of the reference printing process then describe a color gradient at least in the vicinity of the gray axis. The first color values which belong to the first tonal values can be determined in this case in accordance with a color profile of the reference printing process or through characterization data from the reference printing process itself. The color values can be specified as Lab color values.

In accordance with another mode of the invention, these first color values can in each case be determined at color loci which are at a predefined distance from one another in the direction of the lightness axis of the color space. In the case of pure white color values with $L=L_{paper}$, which describes the paper white, and in the case of pure black color values with $L=0$, the gray balance can be predefined in a fixed manner in each printing process. No correction is necessary for this purpose. The first color values from the reference printing process can therefore advantageously be chosen within an interval on the lightness axis of the color space which has an upper and lower barrier in the region of the pure black ($L=0$) and the paper white ($L=L_{paper}$). In general, three first color values are sufficient to predefine a gray balance of the reference printing process. These can, for example, be distributed equidistantly along the lightness axis of the color space.

This gray balance predefined through a reference printing process is used to correct a target printing process in relation to the gray balance thereof, i.e. to calibrate the target printing process with reference to the gray balance. For this purpose, chromatic tonal values of the target printing process are determined which at least describe the corrected gray balance of the target printing process. The first color values are at least used to determine the chromatic tonal values of the target printing process. Chromatic tonal values means the tonal values of the chromatic process colors of the target printing process which, when overprinted, are intended to result in a gray, i.e. non-chromatic, hue.

In order to determine the chromatic tonal values of the target printing process, firstly second color values of the target printing process are derived from the first color values of the reference printing process. The second color values derived in this way predefine at least the corrected gray balance of the target printing process.

In order to determine the corresponding tonal values of the target printing process from the second color values, firstly first characterization data of the target printing process are determined. The tonal values of the target printing process can be determined from this first characterization data determined in this way and the second color values of the target printing process. These tonal values are then assigned to the second color values of the target printing process and result in a corrected gray balance.

In this case, the tonal values of the target printing process can, in particular, be determined from the second color values iteratively, for example by a tonal value combination of the chromatic process colors of the target printing process in each case first being predefined. Through the use of the characterization data from the target printing process, these tonal value combinations can then be assigned color values and, by iteratively changing the individual tonal values of the chromatic printing inks one after another, a tonal value combination which corresponds to the determined second color values of the target printing process can be determined.

In this way it is possible to determine tonal value/color value combinations of the target printing process which can be assigned to corrected characterization data. Characterization data corrected in this way then includes a corrected gray balance of the target printing process.

Alternatively or additionally, it is also possible to create a correction function which, based on the second color values and the tonal values determined in this regard, describes a corrected assignment of color values to tonal values of the target printing process in accordance with the corrected gray balance. This correction function can, in particular, be a tabular assignment, for example through the use of look-up tables. Accurate values can then be determined iteratively.

Starting from this corrected gray balance, a profile of the target printing process can alternatively or additionally be adapted or created which includes a tonal value gradient according to the corrected gray balance. Adaptation can also include the recalculation of individual tonal values and tonal value/color value assignments directly during the production of printing forms or during screening.

On the basis of the correction function, the corrected characterization data or the adapted or created profile of the target printing process, at least one printing form is produced and a printing material is imaged on the basis of this printing form. The first characterization data from the target printing process can simultaneously be used for the calibration of the target printing process itself. In this way, in one method step, calibration of the printed image of the target printing process and gray balance adaptation can be carried out without further test forms having to be imaged and evaluated following the production of first characterization data.

In accordance with a further mode of the invention, provision is made for at least one test element having measuring areas to be printed on a printing material in accordance with the target printing process. The measuring areas of the at least one test element are measured through the use of a photospectrometer, so that current spectral data is acquired. According to the invention, the first characterization data should then be determined on the basis of the current spectral data. In order to save space on the printing material, provision is advantageously made for fewer measuring areas to be printed in the test element than characterization data are to be determined. The remaining first characterization data are then to be calculated from the current spectral data. In this way, on the printing material or the printing forms on which this is based, there remains sufficient space to accommodate further test elements, test areas or test images, and to further improve the quality of the printing process quickly in a straightforward way.

In accordance with an added mode of the invention, in order to keep the test element as small as possible, that is to say to provide as few measuring areas as possible, provision is made for a model to be used to calculate color values of a printing process, in order to calculate the first characterization data from the current spectral data from the measuring areas. The model is configured in such a way that at least one parameter of the model, which describes the association between the tonal values and the color values of the first characterization data as well as possible, is calculated from the current spectral data.

This test area according to the invention can be produced both in a test print by using a test form and also generally imaged in a region of the printing original and the printing form that is not to be used.

A first tonal value gain for the associated tonal values of the colored areas in the first subset can then be determined on the basis of a first subset of this stored current data. Alternatively or additionally, a tonal value curve for this first subset can also be determined.

Since this tonal value gain is firstly determined once for individual, specific tonal values, provision is further made for these first tonal value gains of the associated tonal values to be used to determine a first tonal value gain curve or tonal value curve through the use of interpolation. In this case, a tonal value curve is to be understood, in particular, to be a curve to represent the current spectral data as a function of the predefined tonal values, i.e. in particular an actual/intended comparison.

Furthermore, at least one second subset of the current data is used to determine the at least one parameter of a model for calculating color values of the printing process. Through the use of a comparison between calculated color values based on the model with measured color values, for example from the second subset or else from a plurality of subsets of the test element or else from different test elements, the parameter can be optimized through the use of iterative adaptation, reducing the difference from the comparison.

Further, the tonal value gain curve or tonal value curve from the first data subset should be used to correct the assignment of tonal values of the printing inks to printed color values or the spectra of the latter. This correction curve should then be used to calculate the corresponding characterization data from the printing process. For instance, look-up tables can be produced from this correction curve. In particular, in this way a more accurate model of the printing process can be achieved, which permits sufficiently exact calculation of the characterization data using a smaller test element.

As opposed to the sole procedure for determining color profiles through interpolated tonal values or tonal value gain curves, in this case, through the model of the printing process, it is also possible to take into account physical boundary conditions of the printing process itself which are actually present but not necessarily known in detail in determining the characterization data. In particular, tonal value gains can now be taken into account more accurately.

Since, through the use of the model being used, these physical properties can be taken into account, it is no longer necessary to use a particularly large number of colored areas as a basis for determining the first tonal value gain curve or tonal value curve through the use of interpolation. The number of colored areas within a test element can therefore be limited by this method. This likewise applies to the determination of all of the necessary characterization data.

In a preferred embodiment of the invention, provision is made for the model being used to be the spectral Yule-Nielsen-Neugebauer model, preferably the segmented spectral Yule-Nielsen-Neugebauer model and, through the use of the first or second subset, for a factor n to be determined iteratively as a parameter for modeling the optical dot growth. Thus, through the use of an iterative method, it is possible to determine a model which describes an optical dot growth and permits more accurate assignment of tonal values to spectrally determined color values, even in regions in which no corresponding colored areas have been printed.

The invention provides for densitometric, colorimetric or else spectral first tonal values or tonal value gains to be calculated from the first subset of current spectral data. In the case of spot colors, spectral tonal values or tonal value gains should preferably be calculated. In particular, it is also possible that spectral tonal values or tonal value gains are calculated exclusively in the colored areas which have color values of spot colors, but, in the remaining colored areas, densitometric, colorimetric or spectral tonal values or tonal value gains are calculated. In particular, from these determined and calculated tonal values and tonal value gains, corresponding curves can be determined, for example through the use of interpolation. In general, however, calculated spectral tonal values are preferred.

In a preferred embodiment of the invention, provision is made for the first subset to be current spectral data which have been picked up from color wedges which preferably are formed of colored areas which are based exclusively on one printing ink and preferably on tonal values with spacings of 10% from one another. Including a zero percentage value, this results in a total of 44 colored areas, for example for a four-color print. If six printing inks are used, then the number rises to 66 colored areas, which are used to determine first tonal value gain curves or tonal value curves through the use of interpolation.

In a further development of the method, provision is made for the second subset to be data from colored areas which are formed by overprinting printing inks that are used. The printing inks used for this purpose are printed in accordance with tonal values which are chosen from a predefined reference point selection. The reference point selection should preferably have a total of k reference points. The individual colored areas are then formed by the printing inks being overprinted in accordance with each possible combination of the reference points. When m printing inks are used, the result is thus $k^m$ combinations of overprinted printing ink coverages.

The reference points 0%, 40% and 100% are preferably made available for selection, which, for a four-color process, results in a total of 81 further colored areas for the determination of the second subset of the spectral data. In the case of a five-color process, the result is then additionally 243 colored areas.

In order to determine the characterization data of a four-color printing process, a total of 44+81=125 colored areas are thus necessary, which is substantially less than the colored areas according to the prior art (according to ISO 12642-2, 1617 colored areas are typically used).

In an inventive development of the method, provision is made for the at least one test element to have colored areas in color wedges for determining the data of the first subset and colored areas for determining the data of the second subset, with the set of colored areas for determining the first or second subset being reduced by the colored areas which are already used to determine the second or first subset. These colored areas should then be printed in only one of the two sets but used to determine both subsets. Alternatively, colored areas for determining the first or second subset on which the same tonal values are based should be used for determining both the first and the second subset, in particular with averaging being provided for repeatedly printed colored areas.

Thus, either a reduction in the necessary colored areas in the test element can be provided or else the accuracy can be increased.

For a four-color printing process, for example, four white areas having 0% ink coverage for the first subset can be deleted and, to determine this zero percentage value, only the white area having 0% area coverage for all of the overprinted color combinations from the set of colored areas is taken, and is used to determine the second subset. Likewise, from the colored areas for determining the second subset, those which have only one printing ink, for example, 40% and 100% in this case, can be deleted.

A minimal test element is then composed of 40 colored areas for determining the first data and 73 colored areas for determining the second data, with a colored area (white) from the second set of colored areas being used to determine the first subset, and eight colored areas (4×40% and 4×100%) from the first set of colored areas being used to determine the second subset. Such a minimal test element is then composed of a total of 113 colored areas for a four-color print.

Furthermore, provision is made in a development for the characterization data to be stored and at least one color profile of the printing process to be created by using this characterization data, with the intention being for this color profile to be used for the color control of a printing press for the printing process.

As described, a minimal test element or else an easily enlarged minimal test element with redundant areas can therefore be used to calculate all of the first characterization data from the target printing process.

Through the use of this first characterization data or else directly by using the model for calculating the first characterization data, according to the invention the tonal values of the target printing process, which are assigned to the second color values, can be determined directly iteratively.

This method is based on minimizing the color error between the predefined second color value $(L_2 a_2 b_2)$ and a temporarily calculated color value $(L_t a_t b_t)$. The color error dE is calculated by using the following relationship:

$$dE = \sqrt{(L_2-L_1)^2 + (a_2-a_1)^2 + (b_2-b_1)^2}$$

The starting value for the iteration can be chosen as desired but it is expedient to start with a value of C=M=Y=50%. Using the starting value, a first value $L_t a_t b_t$ is calculated, and also the color error $dE^0$ This calculation of the temporary color value $L_t a_t b_t$ is carried out through the use of the first characterization data or through the use of a profile calculated therefrom.

In a first step, the tonal value for C is increased by dx=2% ($C^+$) and reduced by dx=2% ($C^-$). The value dx=2% has proven to be expedient but can also be chosen differently. The color error $dE^+$ and $dE^-$ is calculated by using these two modified values. If $dE^+$ is less than $dE^0$, the value increased by 2% is used as a new value for C. If $dE^-$ is less than $dE^0$, the value reduced by 2% is used for C. If both values $dE^+$ and $dE^-$ are greater than $dE^0$, C is kept.

In a second step, the tonal value for M is increased by 2% ($M^+$) and reduced by 2% ($M^-$). The color error $dE^+$ and $dE^-$ is calculated by using these two modified values. If $dE^+$ is less than $dE^0$, the value increased by 2% is used as a new value for M. If $dE^-$ is less than $dE^0$, the value reduced by 2% is used for M. If both values $dE^+$ and $dE^-$ are greater than $dE^0$, M is kept.

In a third step, the tonal value for Y is increased by 2% ($Y^+$) and reduced by 2% ($Y^-$). The color error $dE^+$ and $dE^-$ is calculated by using these two modified values. If $dE^+$ is less than $dE^0$, the value increased by 2% is used as a new value for Y. If $dE^-$ is less than $dE^0$, the value reduced by 2% is used for Y. If both values $dE^+$ and $dE^-$ are greater than $dE^0$, Y is kept.

These three steps are repeated iteratively until the values for CMY no longer change and the color error no longer becomes smaller. The new CMY tonal values represent a better approximation to the result.

In a next step, the value dx is reduced, expediently halved. Using these new values, the above three steps are repeated until no improvement in the result is established. The value dx is then reduced iteratively until a predefined accuracy of the result is achieved. This is usually achieved at a dx value of 0.05%. Higher accuracies no longer improve the method but are only more time-consuming.

No profiles or tables are needed for this calculation of the tonal values relating to the predefined second color values and vice versa. The calculation can be carried out directly from the spectrally measured colored areas of the test element. This is done, as described above, for example through the use of the segmented spectral Yule-Nielsen-Neugebauer model.

In order to determine the first color values of the reference printing process, provision is made in an alternative embodiment to determine these from the values of the paper white in a device-independent color space, for example the Lab color space, by using an attenuation factor D.

For this purpose, the first color values $(L_1 a_1 b_1)$ can be determined from the color values of the paper white $(L^*_{RW}, a^*_{RW}, b^*_{RW})$ of the reference printing process, at predefined lightness values $L_1$ in accordance with the following formula (1) in relation to $a_1$ and $b_1$:

$$A_1 = a^*_{RW} \times (1 - D \times (L^*_{RW} - L_1)/L^*_{RW})$$

$$B_1 = b^*_{RW} \times (1 - D \times (L^*_{RW} - L_1)/L^*_{RW})$$

The attenuation factor D can be determined experimentally. The value D=0.85 has proven to be very useful experimentally as the attenuation factor D in order to substantially determine first color values on or at least close to the gray axis of the color space of the reference printing process.

In a development of the invention, provision is made for paper color values for the paper white of the reference and of the target printing process to be determined first. This can be done, for example, through the use of the test elements that are used. According to the invention, the implementation of the second color values of the target printing process should then be carried out by taking, in particular, the differences in the paper white values into account. In this case, the adaptation of the human eye to the different paper white values and paper color values of the different printing materials can substantially be taken into account.

According to the invention, equation (1) can also be used to adapt the paper white $(L^*_{RW}, a^*_{RW}, b^*_{RW})$ of the reference printing process to the paper white $(L^*_{ZW}, a^*_{ZW}, b^*_{ZW})$ of the target printing process. By using the differences $$dL^* = L^*_{RW} - L^*_{ZW}, da^* = a^*_{RW} - a^*_{ZW}, db^* = b^*_{RW} - b^*_{ZW} \quad (2)$$

the relationships $$L^{*\prime} = L^* - dL^* \times (1 - 0.85 \times (L^*_{RW} - L^*)/L^*_{RW})$$

$$a^{*\prime} = a^* - da^* \times (1 - 0.85 \times (L^*_{RW} - L^*)/L^*_{RW})$$

$$b^{*\prime} = b^* - db^* \times (1 - 0.85 \times (L^*_{RW} - L^*)/L^*_{RW}) \quad (3)$$

result for all general color values $(L^* a^* b^*)$ of the reference printing process and corresponding color values $(L^{*\prime} a^{*\prime} b^{*\prime})$ of the target printing process.

In this way, in particular by determining gray color values as first color values ($L_1 a_1 b_1$) from the paper white ($L^*_{RW}$, $a^*_{RW}$, $b^*_{RW}$) of the reference printing process and from the paper white ($L^*_{ZW}$, $a^*_{ZW}$, $b^*_{ZW}$) of the target printing process and taking an attenuation factor D into account, the second color values ($L_2 a_2 b_2$) of the target printing process can be determined. For reasons of simplicity, the attenuation factor D in equation 3 has already been replaced by the experimentally preferred value 0.85.

With the objects of the invention in view, there is also provided a printing system for imaging printing material to carry out the method according to the invention. The printing system comprises a printing form preparation device for creating printing forms, a printing press for imaging printing material based on the created printing forms, a gray balance correction device for calibrating a target printing process in accordance with predefined target printing conditions based on predefined gray values of a reference printing process under reference printing conditions, the gray balance correction device having a calculation unit for determining tonal values of chromatic process colors of the target printing process in accordance with a corrected gray balance, and the calculation unit determining the tonal values as a function of first color values on or in surroundings of a gray axis of a color space of the reference printing process and of first characterization data of the target printing process.

As mentioned above, the printing system has a gray balance correction device having at least one calculation unit for determining tonal values of the chromatic process colors of the target printing process. This calculation unit is constructed in such a way that it is able to determine the tonal values in accordance with a corrected gray balance. The calculation unit is also configured in such a way that it determines the tonal values as a function of first color values on or in the surroundings of the gray axis of the color space of the reference printing process and as a function of the first characterization data from the target printing process.

In accordance with another feature of the printing system of the invention, a spectral measuring device is provided for the spectral measurement of measuring areas of a test element. The intention is to be able to determine current spectral data through the use of this measuring device. Furthermore, there should advantageously be a conversion element for calculating the first characterization data from the current spectral data. In this way, through the interaction of the spectral measuring device and the conversion element, first characterization data can be calculated in a straightforward way. The spectral measuring device can, for example, be a spectrophotometer.

With the objects of the invention in view, there is furthermore provided a computer program product which is suitable for carrying out the method according to the invention.

With the objects of the invention in view, there is concomitantly provided an independent storage device for storing the computer program.

Other features which are considered as characteristic for the invention are set forth in the appended claims.

Although the invention is illustrated and described herein as embodied in a method and a printing system for gray balance correction of a printing process, a computer program product and a computer program storage device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a diagrammatic plan view of a test element;

FIG. 3 is a plan view of a reduced test element;

DETAILED DESCRIPTION OF THE INVENTION

Figure 1:
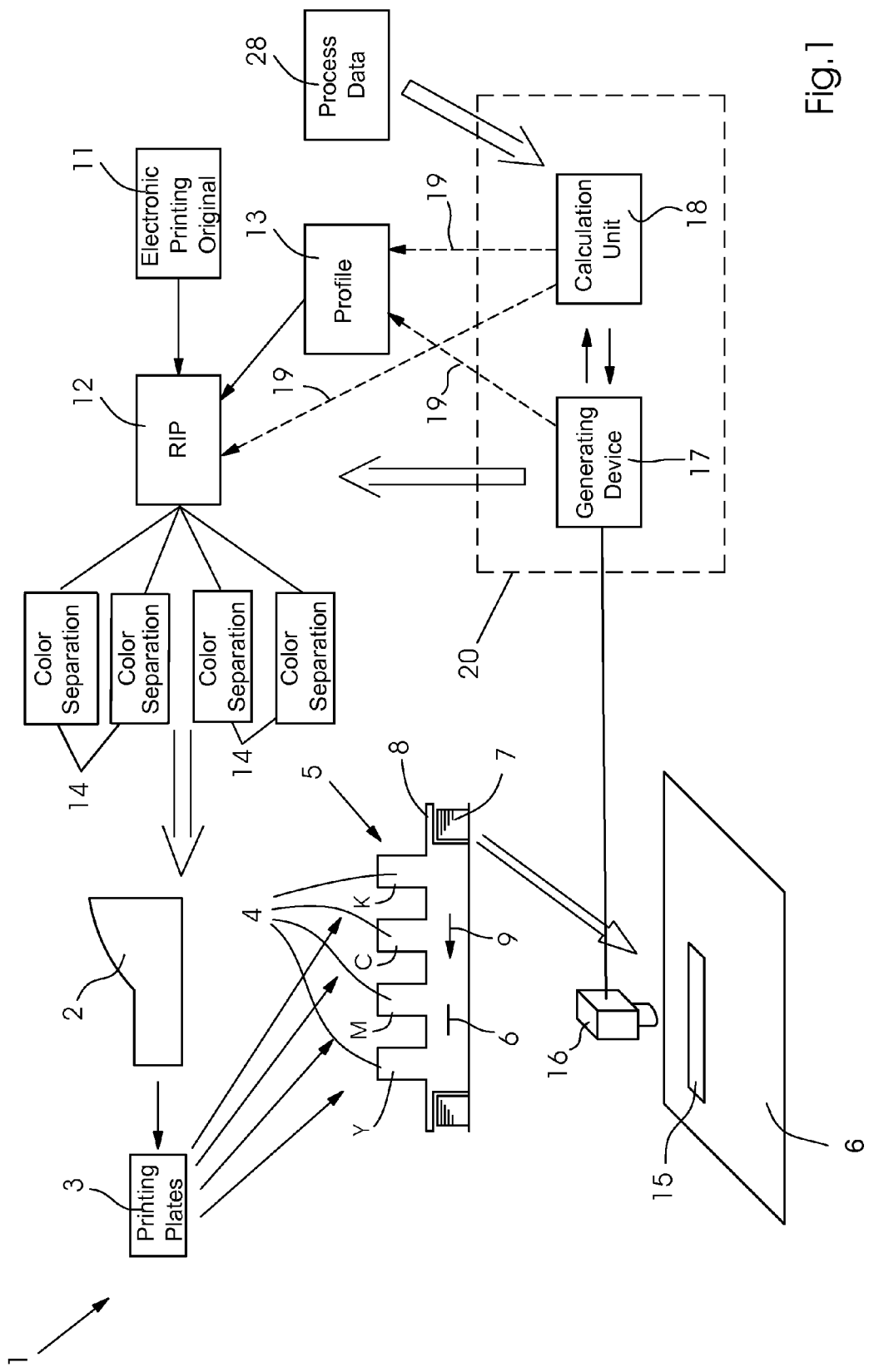
FIG. 1 is a block diagram of a printing system for carrying out a gray balance correction of a target printing process.

Referring now in detail to the figures of the drawings, which show an example of the invention but to which the invention is not restricted and from which further inventive features can be gathered and first, particularly, to FIG. 1 thereof, there is seen a printing system 1 which substantially illustrates a target printing system. The printing system 1 is described by printing process conditions. Printing process conditions include properties of the printing process, such as a screening method, screen angle, screen width, printing plate exposer, two printing inks CMYK or printing sheets 6 which are used, for example.

All of the constituent parts of the printing process conditions have an effect on the color representation on a printed sheet 6.

In order to image a printing sheet 6 in a printing press 5, firstly an electronic printing original 11 is screened through the use of a raster image processor (RIP) 12. Color separations 14, which are screened in this way, are created from the electronic printing original 11 and are assigned to the individual printing inks CMYK of the printing process. The electronic color separations 14 are fed to a plate exposer or preparation or production device 2, which images printing plates 3 on the basis of their data. The printing plates 3 are clamped into printing units 4 of the printing press 5 and, in these printing units 4, image a printing sheet 6 with the printing inks CMYK being used. For this purpose, the printing sheet 6 is separated from a sheet stack 7 within a feeder 8 and led through the printing press 5 in a transport direction 9. The then printed sheet 6 is removed from the printing press 5. The printing sheet 6 has been printed with a test element 15 in order to calibrate the printing system 1. Such a test element 15 and a form of a test element 15' which is reduced with respect thereto, are illustrated in FIGS. 2 and 3.

The test element 15 is measured through the use of a spectrophotometer 16. In this way, current spectral data is generated. This current spectral data is fed to a complex 20. The complex 20 includes a generating device 17 for generating first characterization data of the target printing process and a calculation unit 18 for calculating a gray balance correction for the target printing system. Instead of measuring the printing sheet 6 outside the printing press 5, it is alternatively also possible to measure the printing sheet 6 inline in the printing press 5.

Both first characterization data for the target printing process and gray balance correction data are generated through the use of the complex 20. These values can be used to generate or to correct a profile 13 for use in the RIP 12 in following printing methods. The data can alternatively also be transferred directly to the RIP 12 for screening a printing original 11. This is illustrated by dashed lines 19.

Process data 28 are provided to the complex 20 in order to carry out a gray balance correction of the target printing system through the use of the complex 20. The process data 28 are data from a reference printing process. The reference printing process is substantially a similar printing process, as described by the printing system 1 of the target printing process. The reference printing process is a printing process which is calibrated, for example, has been assessed in relation to its gray balance and represents an original with respect to the gray balance to be achieved in the target printing process. The process data 28 of the reference printing process can, for example, be first color values ($L_1 a_1 b_1$) of the reference printing process, which describe gray values of combinations of chromatic printing inks on the gray axis of the reference printing process. Furthermore, the process data 28 can also include the color value $L^*_{RW} a^*_{RW} b^*_{RW}$ of the paper white of the reference printing process and further necessary printing process conditions of the reference printing process. Alternatively or additionally, the process data 28 can also include a color profile of the reference printing process or characterization data of the reference printing process. The characterization data of the reference printing process can be determined, for example, with the same test elements 15, 15' and the same method, as described below.

FIG. 2 shows a first example of a test element 15 according to the invention. This is an example of a four-color system with the colors CMYK.

The test element 15 is divided into two subregions 21 and 22. These subregions 21, 22 of the test element 15 are assigned colored areas 23 in each case. The set of colored areas 23 which are assigned to one subregion 21, 22 are in each case assigned an individual subset 54, 54' of subsequently measured current data.

The subregion 21 includes colored areas 23 which build up a stepped wedge. To this end, the colored areas 23 are in each case built up only from one printing ink (CMYK) having different tonal values. If the tonal value is around 0% in each case, then four white colored areas 24 are formed. In the case of a tonal value of 100%, the result is four full-tone colored areas 26. The remaining colored areas 23 result from variations of the tonal values in each case having a 10% spacing from the tonal value, so that the result in this case is a total of 36 tonal value colored areas 27.

While the subregion 21 is built up from 44 colored areas in the form of a stepped wedge, the subregion 22 is formed of a total of 81 colored areas 23. In this case, the colored areas 23 are formed by overprinting the different printing inks (CMYK) in all possible combinations. The possible combinations result from the number of reference points at which the tonal values of the individual printing inks (CMYK) are predefined. In the example illustrated herein, the reference points used should be color values of the values 0%, 40% and 100%, so that for each printing ink CMYK three different tonal values are available. The number of combinations of the overprinted printing inks CMYK is therefore given as 81 in accordance with the formula $k^m$, where k describes the number of printing points and m the number of printing inks.

Additionally, in the possible combinations of the overprinted printing inks CMYK, there results an area having a white colored area 24, a total of four full-tone colored areas 26 with a coverage of 100% in each case with only one printing ink CMYK, and four further tonal value colored areas 27 with a coverage of 40% each having only one printing ink CMYK. The remaining 72 colored areas 23 are then given by mixed-color areas 25. A mixed-color area 25 is to be understood as a colored area 23 which has been printed with at least two different printing inks CMYK.

FIG. 3 shows an alternative version of an element 15', in this case redundant colored areas 23 having been deleted in each of the subregions 21', 22'.

Since there are white colored areas 24 present in both subregions 21, 22 of the test element 15, the white colored areas 24 of the subregion 21 have been deleted in the test element 15', so that the reduced subregion 21' now has four full-tone colored areas 26 and 36 tonal value colored areas 27. In the subregion 22', on the other hand, the four full-tone colored areas 26 which are identical with the full-tone colored areas 26 of the subregion 21' have been omitted, as have the tonal value colored areas 27 which were also identical to tonal value colored areas 27 of the subregion 21', so that in this case use is only made of a number of 72 mixed-color areas 25 and a white colored area 24, consequently only a total of 73 colored areas.

The entire reduced test element 15' then includes only 113 colored areas 23 and nevertheless serves as a starting point for determining the necessary first characterization data of the target printing process.

As a result of the small extent of this reduced test element 15' or else even of the test element 15 itself, it is possible to apply these test elements 15, 15' in an unused edge region of the printing sheet, for example even during a printing process. Preferably, however, they are used in a dedicated test form. Whereas, for a four-color print, the subregion 22 includes $k^m = 3^4 = 81$ colored areas 23, a corresponding subregion 22 of a test element 15 for six printing inks, likewise with 3 reference points, would have $3^6 = 729$ colored areas 23.

A further reduction in the colored areas 23 can be made, in particular for a use of more than four printing inks, by using a color space separation, as described in German Patent Application DE 10 200 24 001 937 A1, corresponding to U.S. Pat. No. 7,032,517. In that case, even for a six-color print, the color space is separated in a corresponding way into regions which have only three printing inks. With reference to the description of German Patent Application DE 10 20024 001 937 A1, corresponding to U.S. Pat. No. 7,032,517, for this splitting of the color space, i.e. the separations described, it is then necessary for each of these separated color space regions once more to use only $k^m$ with m printing inks used in the region considered and k the number of reference points, i.e. the values used in the overprinting of the different printing inks corresponding to a total of three times $k^m = 3 \cdot 81 = 243$ colored areas 23, only three reference points being used in each subregion or segment of the color space and four printing inks being overprinted. Overprinting more than four printing inks is not envisaged.

A test element 15, 15' as described above can be exposed onto a printing plate 3 in the target printing process both for determining the characterization types of the printing system 1 and for the gray balance correction, and applied to a printing sheet 6 in the printing press 5. Alternatively, it is in particular also possible, due to the dimensions of the test elements 15, 15', to print them in an edge region of a printing sheet 6.

Figure 4:
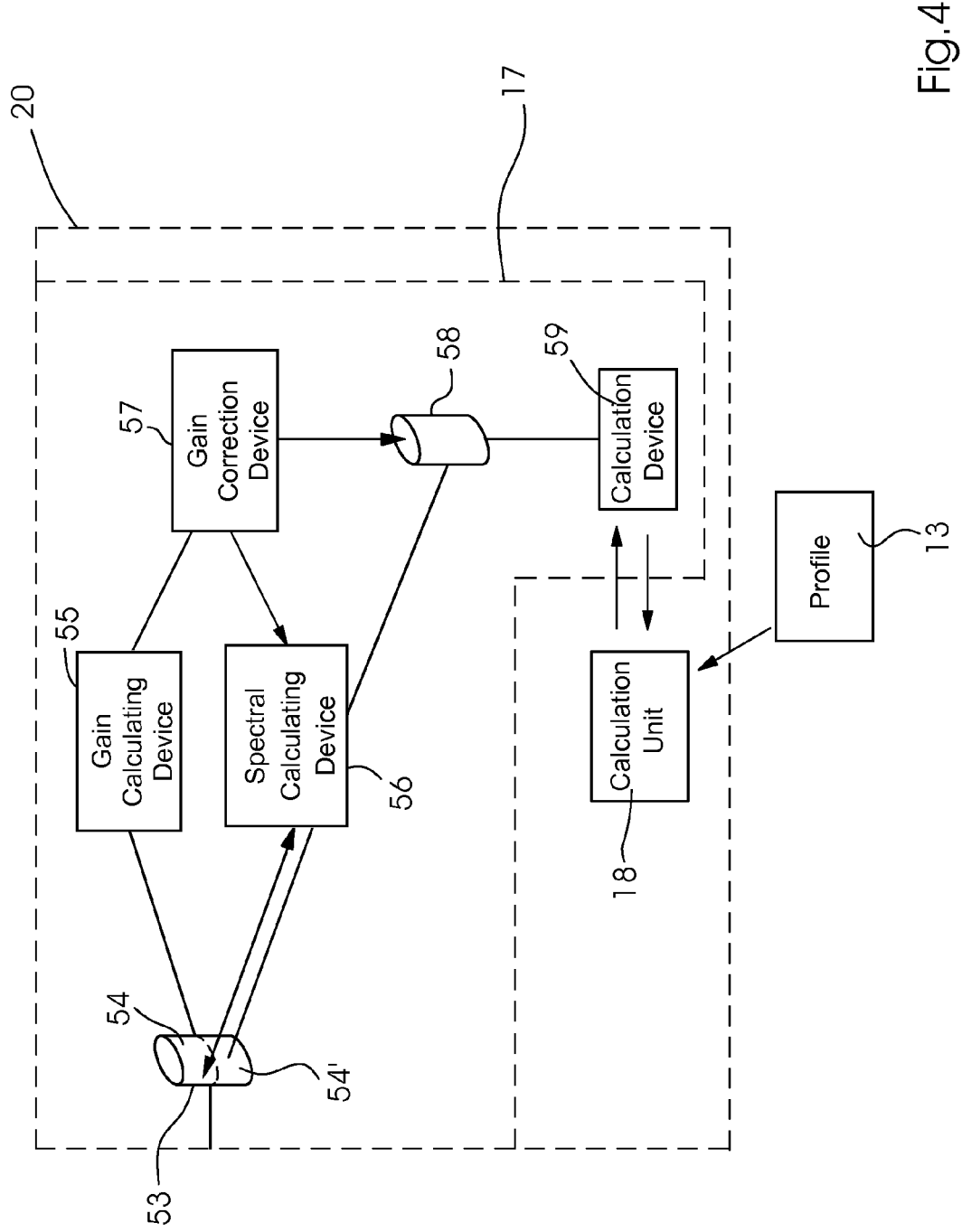
FIG. 4 is a block diagram of a complex for calculating a gray balance correction and for producing first characterization data.

FIG. 4 shows a corresponding structure of the complex 20 for generating first characterization data and the gray balance correction. In the following, the use of a reduced test element 15' will be shown. The use of the expanded test element 15, in particular with the formation of averages, is easy for those skilled in the art to carry out in a corresponding way and may also be preferred in order to increase the accuracy.

The measurement results determined by the spectrophotometer 16 are stored in a storage device 53 as current spectral data 54, 54'. The current spectral data include a first subset 54 and a second subset 54', which can each be allocated to the subregions 21' and 22' of the reduced test element 15'. The colored areas 23 which have been left out in the respective subregion 21, 22 in order to reduce the test element 15 to a reduced test element 15' are now assigned to both subsets 54, 54'. This can be achieved, in particular, by doubling the appropriate data.

The first subset 54 of the stored current spectral data is passed onto a tonal value gain calculating device 55. It is alternatively possible for the tonal value gain calculating device 55 to also make direct access to the data subset 54. Densitometric, colorimetric or spectral tonal values and/or tonal value gains are obtained by known methods on the basis of this spectral data, in particular from the color wedges of the subregion 21' of the reduced test element 15', with access also being made back, in particular, to the white area 24 from the subregion 22' of the reduced test element 15'.

Corresponding tonal value gain correction curves for the individual printing inks CMYK are determined by suitable interpolation methods from the tonal value gains determined in this way for the individual printing inks CMYK in accordance with the color wedges of the subregion 21' or alternatively of a subregion 21. In general, through the use of these color wedges 21', tonal value gain correction curves, tonal value correction curves for all of the printing inks being used, that is to say even of multicolor printing systems, in particular also for spot colors, can be determined. When spot colors are used, the spectral tonal value gain is preferably calculated from the first subset of the stored spectral data 54. As a result of using spectral tonal value gains, the accuracy can generally be increased for all colors.

Furthermore, a spectral calculation device provides makes access to the second subset 54' of the stored current data in the storage device 53. Spectra for all of the possible overprints of the various printing inks can be calculated through the use of a model stored in the spectral calculation device 56 by using this second subset 54', which substantially corresponds to the reduced subregion 22' of the test element 15', and while taking into account spectral data from colored areas 23 which, in order to reduce the test element 15', are no longer used in the subregion 22' but instead only in the subregion 21' and which now belong to the first data subset 54.

The model used for calculating the spectra of the different overprints of printing inks is preferably the so-called segmented spectral Yule-Nielsen-Neugebauer model (CYNSN Cellular Yule-Nielsen modified spectral Neugebauer model). Other models for calculating spectra from the pre-definition of measured reference points can also be used.

According to the segmented spectral Yule-Nielsen Neugebauer equation, the spectrum for a combination of printing inks in a segment of a body which is covered by the printing inks being used is calculated in accordance with the following equation:

$$R(\lambda) = \left[\sum_{i=1}^{NP} a_i \times R_i^{1/n}(\lambda)\right]^n \quad (4)$$

Incidentally, the reference points $R_i$ that are used, which are the corner points of the individual segments of the body of the printing inks, are defined by the predefined percentage values of the printing inks in the subregion 22 or 22' of the test element 15, 15'. In the example used, three reference points 0%, 40% and 100% are therefore defined. The reference points $R_i$ correspond to the current spectral data from the colored areas 23 at these points. In general, when m printing inks are used in the printing process, an m-dimensional body is covered by the printing inks being used, with the axes of the body in each case being formed from the spectral values which correspond to the tonal values of only one printing ink. Because of the segmentation of this body, the result is in turn bodies which are defined by the selected reference points within the body of printing inks.

In the conventional Neugebauer model, the reference points being used are the paper white and the full-tone colored areas. In the print, all combinations of the overprints are accordingly then additionally created for the purpose of characterization. In a print with three colors, these would be $2^3=8$ combinations, in a print with four-colors, $2^4=16$ combinations. In general, the number of combinations is given by the number of reference points for each color component raised to the power of the number of color components as $NP=k^m$.

The introduction of a further reference point (k=3) as in the segmented spectral Yule-Nielsen-Neugebauer model discussed then leads to 81 combinations, as mentioned, when printing with four-colors. The number and distribution of the reference points for each color component should be chosen in such a way that the visually most uniform coverage is carried out. This is provided by the proposed reference points 0%, 40% and 100%, which has been shown through the use of empirical considerations, with very good results also being achieved with 50% instead of 40%.

Depending on the printing inks being used, i.e. on their number and the number of reference points, the number of segments or cells in the segmented model is given by $Z=(k-1)^m$, with each cell again having $NP=2^m$ reference points. For each of these segments, the simple spectral Yule-Nielsen-Neugebauer model is then true, and thus the equation (4), with the index i relating to the corner values of a segment. The number of corner values of the segment NP is given by $NP=2^m$, with m as the number of printing inks. The reference points are therefore defined by the overprinting of two possible printing inks.

The values $\alpha_i$ are the so-called Demichel coefficients. When, for example, three printing inks are used, CMY, for example, they are given by the equations:

$\alpha_1(CMY)=(1-c_l)(1-m_l)(1-y_l)$ $\alpha_2(CMY)=(c_l)(1-m_l)(1-y_l)$ $\alpha_3(CMY)=(1-c_l)(m_l)(1-y_l)$ $\alpha_4(CMY)=(c_l)(m_l)(1-y_l)$ $\alpha_5(CMY)=(1-c_l)(1-m_l)(y_l)$ $\alpha_6(CMY)=(c_l)(1-m_l)(y_l)$ $\alpha_7(CMY)=(1-c_l)(m_l)(y_l)$ $\alpha_8(CMY)=(c_l)(m_l)(y_l)$ \quad (5)

The effective area coverages $c_l$, $m_l$ and $y_l$ of the half tones must be normalized for the calculation:

$c_l=(C-0)/(Cs-0)$ for $C<Cs$ $=(C-Cs)/(100-Cs)$ for $C \geq Cs$ $m_l=(M-0)/(Ms-0)$ for $M<Ms$ $=(M-Ms)/(100-Ms)$ for $M \geq Ms$ $y_l=(Y-0)/(Ys-0)$ for $Y<Ys$ $=(Y-Ys)/(100-Ys)$ for $Y \geq Ys$ \quad (6)

with Cs, Ms, Ys being the tonal values of the segment partition.

For clarity, a restriction to three printing inks has been applied in this case. When four or more printing inks are used, for example in addition to the use of the printing ink K as in the above example, the factors $k_l$ and $(1-k_l)$ are added accordingly, so that in the case of 12 reference points $R_i$ a total of 16 Demichels coefficients $\alpha_l$ are provided.

The effective area coverages $c_l$, $m_l$ and $y_l$ of the half tones describe the relative area coverage of a printed dot which would lie within a corresponding segment. Through the use of the equation (1), on the basis of the measured spectra of the k reference points $R_i$, which have been determined on the colored areas 24, 25, 26 and 27 of the subregion 22 or 22' of a test element 15 or 15', the spectra of any desired tonal value combinations within a segment can now be calculated.

Through the use of these pre-definitions which, as described, can easily be expanded to four or more colors, the spectral values $R(\lambda)$ for all of the printing ink combinations within a segment can then be calculated. By using the factor n according to formula (4), optical image point broadening should be taken into account.

According to the example presented herein, the factor n is determined by calculating the spectra of the tonal value colored areas 27 of the subregions 21, 21' and/or 22, 22' in accordance with the segmented spectral Yule-Nielsen-Neugebauer model. If further color wedges or test elements are used on the same test form or printing form, then colored areas from these test elements can additionally or alternatively be used for determining the factor n.

For this purpose, firstly an arbitrary value for n is inserted, with the value n=2 being preferred as a starting point. By iteratively changing the factor or parameter n, the factor n is adapted in such a way that the differences between the calculated spectra $R(\lambda)$ and the measured spectra of the colored areas 27 or all of the colored areas 23 of the subregion 21, 21' and/or 22, 22' are minimized. In this case, n can be minimized overall, over all of the colored areas 23 of a subregion or for the individual colors of the subregion 21, 21'. Averaging can then be carried out in this case.

Since the factor n determined in this way is always still a model, it is not yet possible through the use of this thus described method for all of the data for characterizing a printing process to be calculated sufficiently accurately.

By additionally taking the tonal value gains or tonal values or a tonal value gain curve into account, such as results from the colored areas 23 of the subregions 21, 21', the segmented spectral Yule-Nielsen-Neugebauer equation according to equation (1) can be adapted to such an extent that all of the data for characterizing a printing process can be calculated with sufficient accuracy, i.e. the spectral Yule-Nielsen-Neugebauer equation used in the model can be used jointly, taking into account the tonal value gain curve correction according to the colored areas 23 of the subregions 21, 21', on its own for calculating all of the necessary characterization data of a printing process, so that the small test elements 15, 15' are adequate for characterizing the printing process. These can then be prepared in an appropriate manner on a test form together with further test elements for further determinations. The small test elements 15, 15' can advantageously completely replace large test elements without sacrificing accuracy.

The tonal value gain correction curve according to the subregions 21, 21' is determined, as described, in the tonal value gain calculating device 55. According to the invention, for predefined tonal value combinations of the printing inks, e.g. CMYK, these tonal values are no longer used directly in the Yule-Nielsen-Neugebauer equation as a constituent part of the Demichel coefficients according to equations 5 and 6. Instead, these tonal values CMYK are firstly corrected in accordance with the tonal value gain curve which is determined and calculated. This is done in a tonal value gain correction device 57, which transfers the tonal values C'M'Y'K' corrected in this way to the calculation device 56 as input variables for the effective area coverages $c_l$, $m_l$, $y_l$ and $k_l$ of the Demichel coefficients of the Yule-Nielsen-Neugebauer equation. It is only on the basis of these tonal-value-gain corrected tonal values C'M'Y'K' that the spectra of the predefined printing ink combinations are then determined by the calculation device 56 in accordance with the model outlined above. The spectra $R(\lambda)$ calculated in this way for tonal value combinations $C_bM_bY_bK_b$, together with the predefined tonal value combination CMYK, are then made available as characterization data in a storage device 58. Through the use of this characterization data, profiling of a printing process can then be subsequently carried out in a calculation device 59, and process calibrations or process controls can be applied.

As already described, this method can be expanded easily with an appropriate adaptation of Demichel coefficients and reference points $R_i$ to multicolor systems, in particular with spot colors.

Thus, in a straightforward way as a result of the use of tonal value gain correction curves in a tonal value gain calculation device 55 for the use of predefined color values of different printing inks in a spectral model of the printing process, in this case the segmented spectral Yule-Nielsen-Neugebauer model, the necessary number of colored areas 23 of a test element 15, 15' can be reduced and simplified very highly, since it has been shown experimentally that, through the use of this interaction with the additional tonal value gain correction curve, in particular all of the spectral values of test elements according to the prior art can be calculated sufficiently accurately enough, and thus all of the tonal value combinations lying in between can be determined correspondingly accurately. Thus, this data is completely sufficient to characterize the target printing process. Instead of the use of tonal value gain correction curves, it is of course also possible to use both the predefined tonal values and the tonal values determined from the determined color values as a basis for a corresponding calculation.

Figure 5:
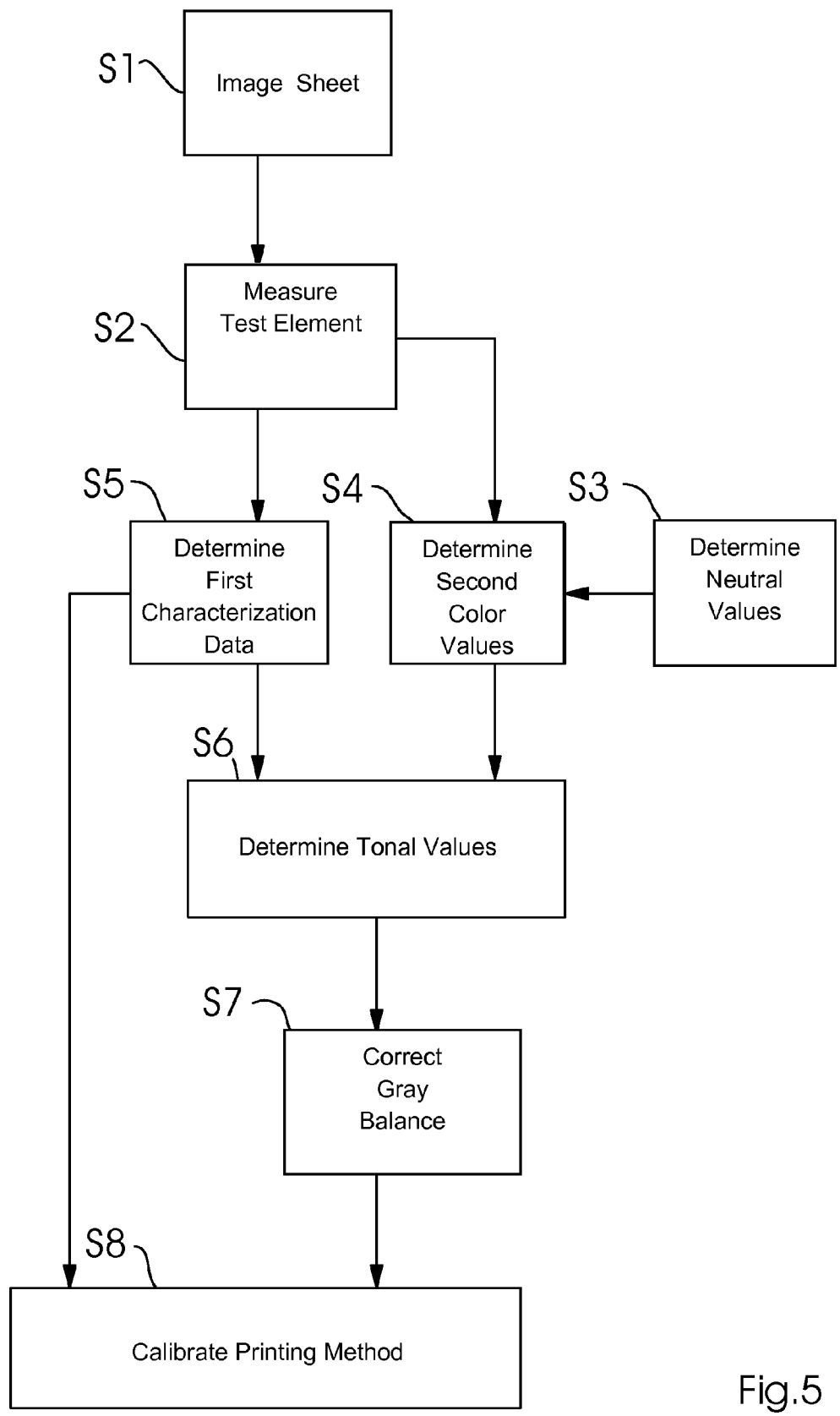
FIG. 5 is a flow chart of the gray balance correction.

At the same time or as an alternative to calculating a complete set of first characterization data of the target printing process through the use of the spectral model of the target printing process, this model or the set of first characterization data can be used to carry out a gray balance correction of the target printing process. A corresponding flow chart for determining the gray balance correction of the target printing process is shown in FIG. 5.

Firstly, in a step S1, a sheet 6 is imaged with a test element 15 in accordance with the target printing process conditions. The imaging can also be done with the test element 15'. The test element 15 is preferred, however, since more accurate values can be achieved in this case through averages. In order to image the sheet 6, it is necessary firstly to image a printing plate 3 in a plate exposer 2. Overall, it is necessary to image as many printing plates 3 as color separations 14 are used for the printing inks CMYK used in the target printing process. For this purpose, the color separations 14 are produced previously through the use of an RIP 12 on the basis of a printing original 11. The printing original 11 can also have further test elements or sample prints in addition to the data for the test element 15.

In the step S1, a sheet 6 therefore has the individual printing inks CMYK applied to it within the printing press 5, so that the printed sheet 6 then has the printed test element 15 or 15'.

In a subsequent step S2, the printed test element 15 is measured through the use of a spectrophotometer 16. In this case, current spectral data 54, 54' is determined. From this current spectral data 54, 54', first characterization data of the target printing process is determined in a following step S5. From this first characterization data from the target printing process, it is in particular also possible to determine a paper color value $(L^*_{ZW}a^*_{ZW}b^*_{ZW})$ of the sheet 6 used in the target printing process. Alternatively, this paper color value $(L^*_{ZW}a^*_{ZW}b^*_{ZW})$, i.e. the paper white of the target printing process, can also be determined directly as a color value in the step S2 from the current spectral data 54, 54', since in this case, in particular, areas without printing inks CMYK are provided. This paper white value $(L^*_{ZW}a^*_{ZW}b^*_{ZW})$ is then used in a further step S4 for determining second color values $(L_2a_2b_2)$ of the target printing process. These second color values $(L_2a_2b_2)$ of the target printing process are the adapted color values from a reference printing process, which there correspond to chromatic gray areas. In a step S4, on the basis of the paper white $(L^*_{ZW}a^*_{ZW}b^*_{ZW})$ of the target printing process and the paper white $(L^*_{RW}a^*_{RW}b^*_{RW})$ of a reference printing process, predefined first color values $(L_1a_1b_1)$ of the reference printing process, which there correspond to gray chromatic areas, are therefore converted into second color values $(L_2a_2b_2)$ of the target printing process. For this purpose, previously in a step S3, first gray color values $(L_1a_1b_1)$ of the reference printing process and the paper white $(L^*_{RW}a^*_{RW}b^*_{RW})$ of the reference printing process are determined. As stated, these first gray color values $(L_1a_1b_1)$ of the reference printing process mean the color values of gray shades of the reference printing process which are built up exclusively from chromatic printing inks without black. These result in the step S3 from the pre-definition of lightness values $L_l$ at which in each case neutral ab values are determined in accordance with the formula (1).

In the step S4, the second color values $(L_2a_2b_2)$ of the target printing process are determined in accordance with equations (2) from the first color values $(L_1a_1b_1)$ and the paper white $(L^*_{RW}a^*_{RW}b^*_{RW})$ of the reference printing process and the paper white $(L^*_{ZW}a^*_{ZW}b^*_{ZW})$ of the target printing process.

The first characterization data of the target printing process, determined in the step S5, and the second color values $(L_2a_2b_2)$ of the target printing process, determined in the step S4, are transferred to a next step S6, in which a determination of the tonal values of the chromatic process colors of the target printing process which correspond to the second color values $(L_2a_2b_2)$ is carried out. In this way, tonal value combinations of the target printing process which correspond to the corrected gray balance of the target printing process are determined.

An iterative method has to be applied in order to determine from the characterization data from step S5 the tonal values assigned to the second color values $(L_2a_2b_2)$ from step S4. In this case, firstly tonal value combinations are predefined and, from the characterization data or alternatively from a profile generated therefrom, color values in the Lab space are calculated. A possible adaptation, firstly of a tonal value, is then decided upon from the difference between the color values calculated in this way and the second color values $(L_2a_2b_2)$. The next tonal value is then varied, a color value is again determined and the direction of adaptation of this tonal value is determined. This is carried out iteratively for all of the tonal values and, in particular in further method steps, the increment for the change in the tonal values is reduced, so that finally the most accurate possible value of the tonal value combination which corresponds to the predefined second color values $(L_2a_2b_2)$ is reached. In this way, in a step S6, tonal value combinations of the target printing process which correspond to the second color values $(L_2a_2b_2)$ of the target printing process and thus the chromatic gray shades $(L_1a_1b_1)$ of the reference printing process are determined. In a step S7, corrections to the overall gray balance of the target printing process are then made from these tonal value combinations. This can be carried out, for example, in such a way that the gray balance for the paper white lies within predefined values at a tonal value combination at (0/0/0) and the gray balance for the black value is likewise predefined at (100/100/100). The tonal value combinations from step S6 that are then introduced then result in a course of the tonal value combinations between the two specified limits. Through the use of an interpolation method, further chromatic gray shades on an appropriate tonal value curve can then be determined. The more chromatic gray areas are predefined in the reference printing process in relation to the gray axis, the more accurately does the gray balance correction for the target printing process then become in step S7. A corresponding correction of the pure black gray values for K can of course also be carried out with an analogous method.

In a step S8 the gray balance correction determined in this way from step S7 is then used together with the characterization data from step S5 to calibrate a printing method according to the target printing process and, alternatively or additionally, to create or to correct a profile 13 of the target printing method or the target printing process, which takes into account the characteristic curves of the target printing process and the gray balance of the target printing process.

Through the use of this correction, in an RIP 12, appropriate screening of a printing original can then be carried out and the quality of exposed printing plates 3 can be improved substantially, in particular, with respect to the gray balance without, following the creation of the characterization data of the target printing process, renewed printing being needed to determine the gray balance correction and no large test element being necessary to determine the gray balance. For this purpose, according to the invention, through the use of a test element 15, 15', recourse can be had in each case to measured current spectral data, which is also further available for the calibration of the target printing process.

The invention claimed is:

1. A method for gray balance correction of a target printing process, the method comprising the following steps:
   determining first color values on or in surroundings of a gray axis of a color space of a reference printing process for the reference printing process;
   determining chromatic tonal values of the target printing process by using the first color values and at least describing a corrected gray balance of the target printing process with the tonal values;
   determining second color values of the target printing process describing the corrected gray balance of the target printing process;
   deriving the second color values from the first color values;
   determining first characterization data of the target printing process;
   determining the tonal values of the target printing process corresponding to the second color values from the first characterization data and the second color values;
   at least one of creating, from the tonal values, a correction function describing a corrected assignment of color values to tonal values or first tonal values to corrected tonal values of the target printing process in accordance with the corrected gray balance, or determining corrected characterization data including the corrected gray balance from the tonal values;
producing at least one printing form based on a corrected assignment of the tonal value assignment according to the corrected gray balance; and
imaging a printing material using the printing form.

2. The method according to claim 1, which further comprises:
printing at least one test element having measuring areas on a printing material, using the target printing process;
acquiring current spectral data by spectrally measuring the measuring areas;
determining the first characterization data based on the current spectral data;
printing fewer measuring areas than the determined first characterization data; and
calculating at least remaining first characterization data from the current spectral data.

3. The method according to claim 2, which further comprises:
calculating the first characterization data by using a model to calculate color values of a printing process; and
calculating at least one parameter of the model from the current spectral data.

4. The method according to claim 1, which further comprises:
determining paper color values for paper white of each of the reference and target printing process; and
determining the second color values while taking differences from the paper white values into account.

5. The method according to claim 1, which further comprises determining a number of first color values at color loci at a predefined distance from one another along a lightness axis of a device-independent color space.

6. The method according to claim 5, which further comprises defining only one selected lightness region for determining the color values.

7. A printing system for imaging printing material to carry out the method according to claim 1, the printing system comprising:
a printing form preparation device for creating printing forms;
a printing press for imaging printing material based on the created printing forms;
a gray balance correction device for calibrating a target printing process in accordance with predefined target printing conditions based on predefined gray values of a reference printing process under reference printing conditions;
said gray balance correction device having a calculation unit for determining tonal values of chromatic process colors of the target printing process in accordance with a corrected gray balance; and
said calculation unit determining the tonal values as a function of first color values on or in surroundings of a gray axis of a color space of the reference printing process and of first characterization data of the target printing process.

8. The printing system according to claim 7, which further comprises:
a spectral measuring device for spectral measurement of measuring areas of a test element for determining current spectral data; and
a conversion element for calculating the first characterization data from the current spectral data.

9. A computer program product in non-transitory form and having a computer-executable instructions which, when loaded into a computer memory, enables the computer to carry out the method according to claim 1.

10. A storage device for storing a computer program product for carrying out the method according to claim 1.

* * * * *